United States Patent Office 3,564,400
Patented Feb. 16, 1971

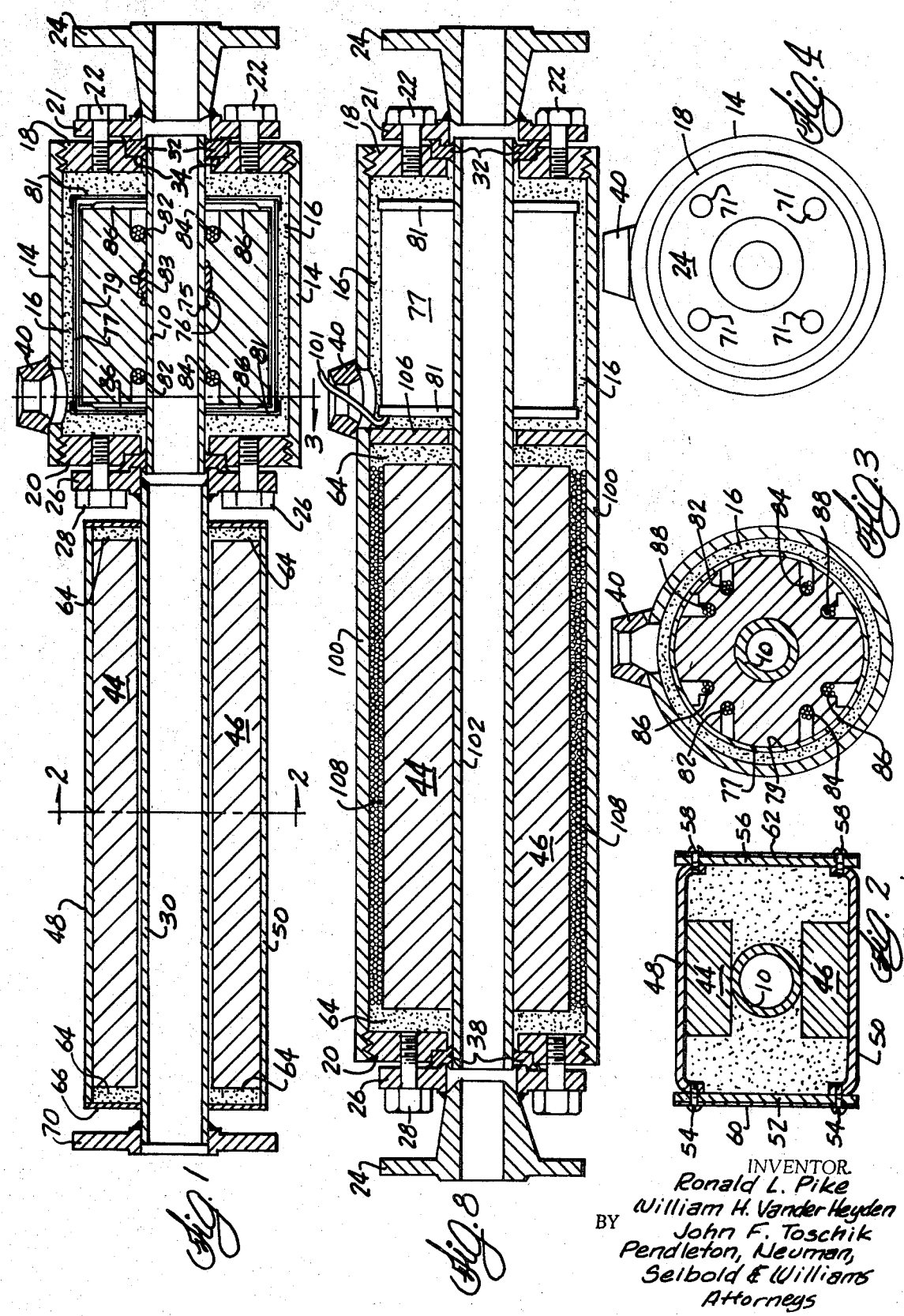

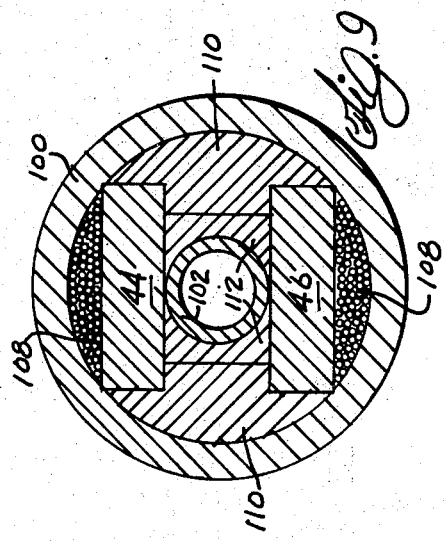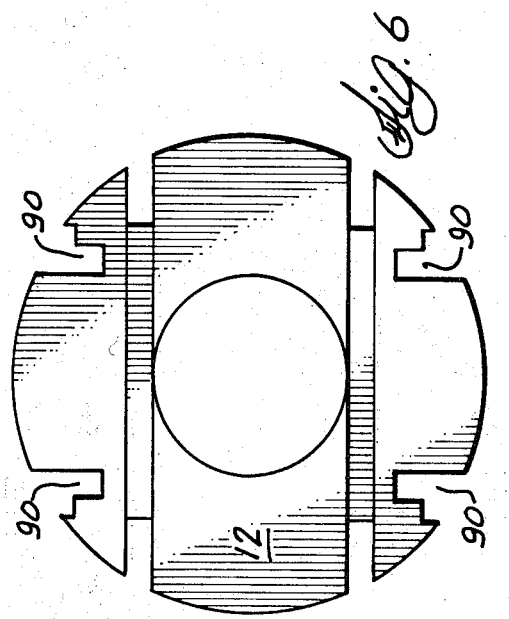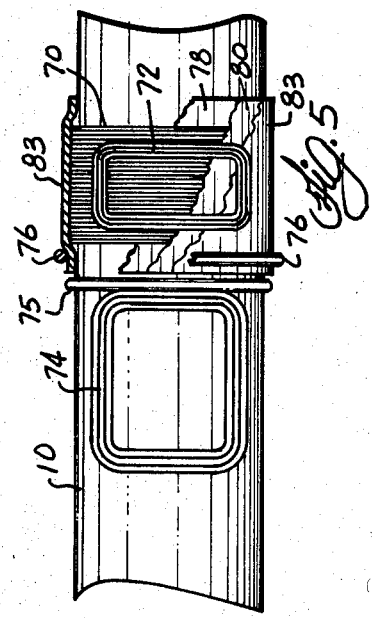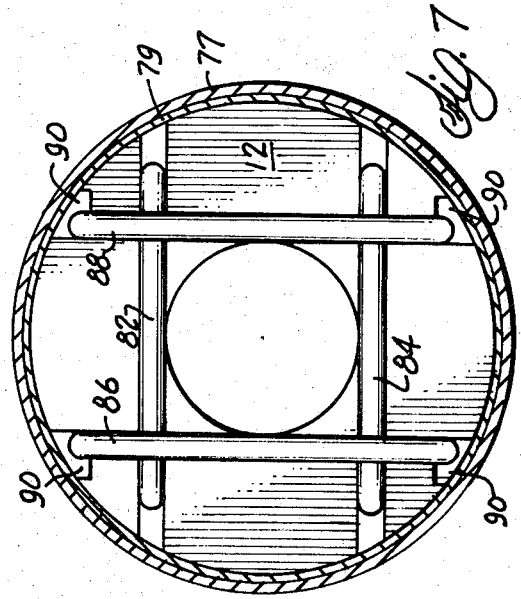

3,564,400
NUCLEAR MAGNETIC RESONANCE FLOWMETER EMPLOYING CERAMIC TUBE
Ronald L. Pike, Brown Deer, William H. Vander Heyden, Menomonee Falls, and John F. Toschik, Brown Deer, Wis., assignors to Badger Meter Manufacturing Company, Milwaukee, Wis., a corporation of Wisconsin
Filed Apr. 18, 1968, Ser. No. 722,365
Int. Cl. G01n 27/78
U.S. Cl. 324—.5
7 Claims

ABSTRACT OF THE DISCLOSURE

A nuclear magnetic resonance flowmeter, employing a ceramic tube as a conduit for paramagnetic fluid, is constructed using moldable ceramic material for encapsulating the coil structure of the flowmeter. The stresses encountered with high pressure, high temperature fluids can be accommodated and graphite seals prevent leakage of the fluid from within the ceramic tube. At each end of the tube a coupling is provided for connection to a conventional conduit. The coil structure is provided with apparatus for assisting in decoupling the receiver coil from the other coils located in proximity thereto, to reduce the noise content of the output signal furnished by the receiver coil.

---

The present invention relates to a nuclear magnetic resonance (or NMR) flowmeter, and particularly to such a flowmeter in which a ceramic tube is employed as the central conduit for conveying paramagnetic fluid. In NMR flowmeters, a flow tube formed of a material having a very low magnetic permeability is required, so that there is no interference with the creation of magnetic fields within the conduit by coils mounted exterior to the conduit. In some applications, it is also necessary to operate the unit at temperatures as high as 300° F. Many materials cannot be effectively used at this temperature because of loss of strength at elevated temperatures. An additional requirement is a low temperature coefficient for the material of the flow tube, and for the coil structure assembly, for the spacing between two of the coils within the assembly is basic to the accuracy of the flowmeter.

Another condition to be met is that leakage from within the flow tube be positively prevented, to prevent the flash of fluids such as volatile hydrocarbons at elevated temperatures.

Still another desirable feature of an NMR flowmeter is the decoupling of the receiver coil from the other coils in the coil assembly, to improve the signal-to-noise ratio.

Accordingly, it is a principal object of the present invention to provide a nuclear magnetic resonance flowmeter which is adapted for operation at high temperatures and pressures.

It is another object of the present invention to provide such a flowmeter in which a high order of accuracy is maintained over the entire range of operating pressures and temperatures.

An additional object of the present invention is to provide a method for assembling a flowmeter having a ceramic flow tube with ceramic material surrounding the flow tube and incapsulating the coil structure.

Another object of the present invention is to provide means for decoupling the receiving coil of the coil structure of the flowmeter from other coils within the coil structure.

These and other objects of the present invention will become manifest upon an examination of the following description and the accompanying drawings in which:

FIG. 1 is a vertical cross-sectional view of an illustrative embodiment of the present invention, taken in a plane passing through the central portion of the conduit;

FIG. 2 is a cross-sectional view of a portion of the apparatus illustrated in FIG. 1 taken in a plane 2—2;

FIG. 3 is a cross-section of a portion of the apparatus illustrated in FIG. 1 taken in the plane 3—3;

FIG. 4 is a side elevation of one end of the apparatus illustrated in FIG. 1;

FIG. 5 is a side elevation of the flow tube and the coil assembly of the apparatus illustrated in FIG. 1;

FIG. 6 is an end view of the coil support illustrated in FIG. 5, without the coils disposed thereon;

FIG. 7 is an end view of the apparatus shown in FIG. 6, but with the coils shown in place;

FIG. 8 is a side elevational view of an alternative embodiment of the flowmeter employing a single casing for both the premagnetizing section and the coil assembly section of the flowmeter; and FIG. 9 is a vertical cross-sectional view through a portion of the apparatus illustrated in FIG. 8.

In accordance with one embodiment of the present invention, there is provided a nuclear magnetic resonance flowmeter employing an elongate central ceramic tube with a smooth interior bore, a first plurality of coils supported on said tube, a coil support member surrounding said tube and said first plurality of coils for supporting a second plurality of coils in fixed relationship with said tube, a metallic cylinder surrounding said second plurality of coils, a casing surrounding said cylinder and said tube, the space between said tube and said casing not occupied by said cylinder being occupied with ceramic material, and means for sealing the ends of said ceramic tube to the ends of said casing jacket.

Referring now to FIGS. 1 and 5, in which one embodiment of the flowmeter is illustrated, a central ceramic tube 10 having a smooth interior bore 10 is the flow tube through which paramagnetic fluid may pass. A series of coils 70, 72, 74, 75 and 76 (FIG. 5) are fixed to the exterior of the tube 10, and a generally circular cylindrical coil support member 12 (FIG. 1) closely surrounds these coils and supports additional coils required in the operation of the flowmeter. The various coils will be more fully described hereinafter in relation to FIGS. 5 to 7.

The coil support member 12 is formed of ceramic material having a very low temperature coefficient so that there is very little change in the position of the various coils for any temperature within the range of operating temperatures of the apparatus. A steel casing 14, forming a circular cylinder, surrounds the tube 10 and the coil support member 12 coaxially therewith, and the interior space 16 between the tube 10 and the casing 14 is occupied by a ceramic material, which also surrounds the coil support member 12.

At each end of the casing 14 is disposed one of a pair of end plates 18 and 20, which are rigidly fixed to opposite ends of the casing 14 by means of cooperating threads on the inside diameter of the casing 14 and the outer surfaces of the end plates 18 and 20. The end plates 18 and 20 both have central apertures which are slightly larger than the diameter of the tube 10, so that they fit easily over the ends of the tube 10. A flange 21 is secured to the end plate 18 by means of bolts 22, and a neck flange 24 is welded to the flange 21 so that there is a continuous coaxial opening through the neck flange 24, the flange 21, and the end plate 18. At the opposite end of the tube 10, a flange 26 is bolted to the end plate 20 by means of bolts 28 and a stainless steel pipe 30 is welded coaxially to the flange 26. At this end also, a continuous coaxial opening is provided through the tube 10, the end plate 20, the flange 26 and the pipe 30.

A graphite sealing ring 32 is disposed between the end plate 18 and the flange 21, in an annular recess 34 provided in the exterior surface of the end plate 18. The interior side of the flange 21 is provided with a boss 36, which has dimenisons comparable to those of the annular recess 34, except that the longitudinal dimension of the boss is not as high as the recess is deep. When the bolts 22 are tightened, the graphite ring 32 is compressed in the recess 34 between the end plate 18 and the boss 36, and is distorted under pressure to flow outwardly from the recess 34 and completely fill up any space between the ceramic tube 10 and the coaxial surfaces of the end plate 18 and the flange 21. A similar arrangement is provided at the other end of the jacket 14 with a second graphite ring 38.

On one side of the casing 14, an access tube 40 is welded so that the interior of the tube 40 leads to an opening 42 within the wall of the casing 14. It is through the opening 42 that the electrical leads may be connected from the coil support member 12 to electronic equipment located exterior to the flowmeter assembly. The tube 40 is preferably provided with a conventional leakproof and explosionproof connector by which the leads are brought out through the opening 42.

The stainless steel tube 30 supports an assembly including an upper permanent magnet 44 and a lower permanent magnet 46. Both magnets are arranged to produce a magnetic field in a vertical direction, as viewed in FIG. 1, so that a steady state, unidirectional magnetic field occupies the area of the pipe 30 enclosed between the permanent magnets 44 and 46. This is the magnetizing field, by which the paramagnetic fluid flowing in the conduit 30 is premagnetized, before reaching the coil assembly. The magnets 44 and 46 are preferably formed of Indox V material, and support a field strength of 1–3 kilogauss.

A return path is provided for the magnetic flux, including an upper wall 48, a lower wall 50, a side wall 52 connected to the walls 48 and 50 by screws 54, and a side wall 56 connected to the walls 48 and 50 by screws 58, all of which are formed of ferromagnetic material, having a high magnetic permeability. The side walls 52 and 56 are each covered with an aluminum end plate 60 and 62, respectively. The upper and lower walls 48 and 50, and the side walls 52 and 56 are all preferably formed of iron, nickel plated for corrosion resistance. The thickness of the walls is great enough so that the flux density within them is well below saturation. The space 64 surrounding the tube 30 and the magnets 44 and 46, included within the walls 48, 50, 52 and 56, is filled with a ceramic material to maintain the pipe 30, the permanent magnets 44 and 46, and the various walls in fixed relationship. The ceramic material also surrounding the ends of the permanent magnet assemblies 44 and 46. Ferromagnetic end pieces 66 and 68 are disposed at the respective ends of the assembly, to help concentrate the field and reduce fringing into the area of the coil support member 12. The end plate 20 and the flange 26 are also formed of ferromagnetic material for this purpose.

A flange 70 is welded to the end of the tube 30, so that connection may be made thereby to conventional metallic pipe.

In FIG. 4 is illustrated an elevation view of one end of the assembly showing bolt holes 71 for locating bolts securing a connection to the flange 24.

The ceramic material employed for the coil support member 12, as well as for the central tube 10, is Ceramacast 510, marketed commercially by Aremco Products, Inc. This material retains its strength over a temperature range of from 20° K. to 500° F. It has a temperature coefficient of 0.14 microinch per degree.

In the construction of the flowmeter, the coils shown in FIG. 5 are mounted directly on the surface of the ceramic tube 10, prior to placing the coil support member 12 in a position surrounding the tube 10 and the coils. This mounting is preferably accomplished by taping the coils in place directly on the tube 10. Thereafter, the coils are varnished and then the ceramic coil support member is cast in place directly over the varnished coils, by using a suitable mold. The coil support member 12 is surrounded by a circular cylindrical shield can 77 of mu metal (a nickel-iron alloy) which forms a magnetic barrier to prevent the influence of stray magnetic fields. The can 77 is provided with end caps 81, crimped in place on the shield. Surrounding the coil support 12 within the mu metal shield is a layer 79 of copper foil, which isolates the coil structure electrostatically. Both the shield can 77 and the foil 79 are grounded by an appropriate lead brought through the opening 42.

Then a ceramic zircon base cement, marketed commerically by the Sauereizen Cements Co. as Sauereizen No. 29, is poured into the space between the shield can 77 and the casing 14.

In the assembly of the apparatus, the end plate 18 is screwed in place in the casing 14, and the graphite ring 32 is placed in the recess 34. Then the tube 10, with the coil assembly 12 including the mu metal shield, is placed in the casing 14, with one end of the tube 10 inserted through the graphite ring 34. The Sauereizen No. 29 compound is then poured in. Immediately afterward, the end plate 20 is screwed in place, and the graphite ring 38 is inserted in its recess, to hold the tube 10 in the correct position while the Sauereizen No. 29 compound hardens for two hours at room temperature. After this, the end plates 18 and 20 are removed and the remaining assembly baked in air for about 6 hours at 300° F. to cure the compound. Then a thin layer of compound is painted over the ends of the assembly, the end caps 18 and 20 replaced, and the flanges 21 and 26 bolted thereto, compressing the graphite rings 32 and 38 to seal the tube. In order to determine when the curing of the compound is complete, the resistance between the shield 77 and the casing 14 is measured. When the resistance increases substantially, the moisture has been driven out of the ceramic material and the cure is complete.

The insulation on the wire connecting the coil structure through the opening 42 is preferably formed of Teflon, which is not harmed by the elevated temperatures achieved during curing and operation.

Referring again to FIG. 5, the position of several of the coils, relative to the central tube 10, is shown. The coils include a receiver coil 70, wound directly about the conduit 10, a saddle-shaped modulating coil 72 having its axis transverse to the tube 10, and a tagging coil 74, arranged in the form of a saddle and with its axis parallel to that of the modulating coil 72. Each of the coils 72 and 74 has a counterpart (not shown) disposed diametrically opposite on the tube 10, and arranged coaxially with it. The series coil 72 and its counterpart are connected in aiding relationship so that a generally rectilinear field is produced between the two coils.

The coil 74 and its counterpart are similarly connected. The tagging coil 74 is located upstream from the receiver coil 70 and the modulating coil 72, and is electrically isolated from the receiver coil 70 by means of a pair of copper decoupling rings 75 and 76, surrounding the conduit 10 and disposed between the coil 70 and 74. The rings 75 and 76 are both formed of one turn of copper wire, wound about the conduit 10 and soldered together to form an axially symmetric torus. The ring 75 is wound directly about the tube 10, and the ring 76 is spaced slightly downstream from the ring 75 and has a slightly larger diameter, being spaced from the tube 10 by an annular spacer, which may conveniently include one or more layers of tape.

The tagging saddle coil 74 and the receiver coil 70 are arranged on the tube 10 so as to have their axes orthogonal, to attempt to achieve minimum coupling between them. In practice, however, there is usually a large induction in the receiver coil 70 as a result of a tagging pulse being applied to the tagging coil 74. The function of the rings 75 and 76 is to decouple these coils by producing a magnetic field tending to oppose that of the tagging coil 74, as a result of magnetic coupling between the tagging coil 74 and the rings 75 and 76. The field created by the coil 74 and that created by the rings 75 and 76, tend to cancel in the vicinity of the receiver coil 70. The optimum positions of the rings 75 and 76 are readily found for any mechanical system by repeatedly adjusting the rings until minimum coupling between the tagging coil 74 and the receiving coil 70 is achieved.

Electrostatic shields 78 and 80 are disposed under and over the receiver coil 70. These shields are formed of metallic ribbons wound about the tube 10 beneath the coil 70, and also overlying the coil 70. Shields 78 and 80 also help to decouple the receiving coil from the tagging coil by reducing the capacitance between them. The shields are grounded by wires connecting both of them to the copper foil 79.

The function of each of the coils of the coil assembly is fully described in the copending application of William H. Vander Heyden for Sideband Detection System for NMR flowmeters, Ser. No. 722,366, filed concurrently herewith. It is to be understood that all of the coils of the coil assembly are connected in the manner illustrated and described in the Vander Heyden application.

The coil support member 12 is shown in FIGS. 6 and 7. In FIG. 7, the coils 82, 84, 86 and 88 are shown in place, disposed within slots formed to accept them. The slots are best illustrated in FIG. 6. The coils 82 and 84 are arranged in generally parallel fashion on the coil support 12, and each of them has a length sufficient to overlap the entire coil assembly illustrated in FIG. 5. The horizontal dimension of the coils 82 and 84, as illustrated in FIG. 7, is also sufficient to overlap the coils shown in FIG. 5, so that all of the coils fixed directly to the tube 10 are exposed to substantially the same intensity of the magnetic field generated by the coils 82 and 84. The coils 82 and 84 are connected in series aiding relationship to produce a field extending vertically as viewed in FIG. 7. The coils 82 and 84 are the $H_0$ coils as described in the aforementioned Vander Heyden application.

Two additional coils 86 and 88 are formed in slots in the coil support 12 and are wound over the ends of the $H_0$ coils 82 and 84. The coils 86 and 88 are connected in series aiding relationship to produce a field extending horizontally as viewed in FIG. 7, and correspond to the $H_1$ coils as described in the aforementioned Vander Heyden application. The ends of the $H_1$ coils overlap, by a substantial distance, the ends of the $H_0$ coils 82 and 84, so that the intensity of the field generated by the $H_1$ coils 84 and 86 approaches its maximum intensity along the conduit wherever the $H_0$ coil intensity has an appreciable value.

The slots in which the $H_0$ coils 82 and 84 are wound on the coil support member 12 extend around the ends of the support member 12, as shown in FIG. 6. This permits the $H_0$ coil to be shorter in length than the $H_1$ coil.

The slots in which the $H_1$ coils 86 and 88 are wound are each provided with a recess 90, extending parallelly on one side of each slot. The recess 90 remains open after the coils 86 and 88 are wound and furnish channels whereby the Ceramacast 510 compound may pass the coil assembly to fill up the interior of the shield can 77 before the ends caps 81 are crimped on.

Referring now to FIG. 8, an alternative embodiment of the present invention is illustrated in which the permanent magnet assembly is enclosed in the same casing 100 with the coil structure. A single ceramic tube 102 extends for the whole length of the casing 100, and the can 77 surrounding the coil support member 12 is located near one end of the tube 102. An access tube 104 is fixed to the side of the casing, and a cable 101 is connected through the tube 104 from the coil structure. A ferromagnetic washer 106 is positioned between the coil support member 12 and the permanent magnets 44 and 46, in order to concentrate the field and reduce fringing of the magnetizing field produced by the magnets 44 and 46. The casing 100 is also formed of ferromagnetic metal to form part of the flux path for the magnetizing field. The magnets 44 and 46 are encapsulated between the tube 102 and the casing 100, as shown in FIG. 8, and steel shot 108 is interposed between the outside surfaces of the magnets 44 and 46 and the inner wall of the casing 100, to reduce the reluctance of the flux path (FIG. 9).

In assembling the flowmeter the permanent magnet end is assembled first. The ferromagnetic washer 106 is first welded in place in the casing 100, and the magnets 44 and 46 placed in position. The steel shot 108 is placed into the space between the magnets 44 and 46 and the casing 100, to provide a low reluctance flux path including the casing 100, while the magnets 44 and 46 are held apart the appropriate distance by a temporary wooden spacer (not shown). Then the Sauereizen material is poured into the shot, and between the magnets 44 and 46, and into the space 110 around the spacer (FIG. 9). The spacer is then removed. The coil support member 12, with the shield can 77 is formed on the tube 102 in the same way as described above, and then the tube 102 and coil structure is placed into the casing 100, and the Sauereizen material poured in flowing around the shield can 77. The Sauereizen material is also poured into the opposite end flowing around the tube 102 in the space 112 left by the wooden spacer to the interior end of the magnets 44 and 46. The the end caps 20 are inserted, with their graphite rings 38, to hold the tube 102 in place, and the compound allowed to set for two hours. Thereafter, the procedure is the same as before.

What is claimed is:

1. In a nuclear magnetic resonance flowmeter, the combination comprising an elongate central ceramic tube, a metallic casing surrounding said ceramic tube, a sheath of ceramic material occupying the space between said tube and said casing, coil means cast in place within said ceramic material comprising a first coil supported on the surface of said tube for producing an electrical signal in response to a change in magnetic flux linking said coil and a second coil spaced from the surface of said tube for generating a magnetic field within the interior of said tube, said ceramic material maintaining said first and second coils in fixed position in relation to said tube, and means for sealing an end of said casing to said tube, comprising an end plate rigidly fixed to an end of said casing and having an aperture for receiving said tube, said end plate having a recess adjacent to and encircling said aperture, a ring of sealing material encircling said tube and dipsosed in said recess, and an end wall bolted to the exterior of said end plate, said end wall having an aperture for receiving said tube and a boss adjacent to and encircling said aperture for compressing said sealing material in said recess as said end wall is bolted to said end plate.

2. In a nuclear magnetic resonance flowmeter, the combination comprising an elongate central ceramic tube, a metallic casing surrounding said ceramic tube, a sheath of ceramic material occupying the space between said tube and said casing, coil means cast in place within said ceramic material comprising a first coil supported on the surface of said tube for producing an electrical signal in response to a change in magnetic flux linking said coil and a second coil spaced from the surface of said tube for generating a magnetic field within the interior of said tube, said ceramic material maintaining said first and second coils in fixed position in relation to said tube, and a sleeve of ferromagnetic material surrounding said first and second coils, and a sleeve of conductive material surrounding said first and second coils, both of said sleeves being cast in place in said sheath.

3. In a nuclear magnetic resonance flowmeter, the combination comprising an elongate central ceramic tube, a metallic casing surrounding said ceramic tube, a sheath of ceramic material occupying the space between said tube and said casing, coil means cast in place within said ceramic material comprising a first coil supported on the surface of said tube for producing an electrical signal in response to a change in magnetic flux linking said coil and a second coil spaced from the surface of said tube for generating a magnetic field within the interior of said tube, said ceramic material maintaining said first and second coils in fixed position in relation to said tube, and a conductive sleeve surrounding said tube between said tube and said first winding, and a conductive sleeve surrounding said first winding between said first coil and said second coil.

4. In a nuclear magnetic resonance flowmeter, the combination comprising an elongate central ceramic tube, a metallic casing surrounding said ceramic tube, a sheath of ceramic material occupying the space between said tube and said casing, coil means cast in place within said ceramic material comprising a first coil supported on the surface of said tube for producing an electrical signal in response to a change in magnetic flux linking said coil and a second coil spaced from the surface of said tube for generating a magnetic field within the interior of said tube, said ceramic material maintaining said first and second coils in fixed position in relation to said tube, and a third coil, said third coil being fixed to the exterior surface of said tube to produce a field parallel to the plane of said first coil, and a ring member encircling said tube between said first and third coils, said ring member disposed in a plane parallel to the plane of said first coil.

5. Apparatus according to claim 4 including a second ring member encircling said tube between said first and third coils, said first ring member having an inner diameter larger than that of said second ring member, and said first ring member being spaced nearer said first coil than said second ring member.

6. In a nuclear magnetic resonance flowmeter, the combination comprising an elongate central ceramic tube, a metallic casing surrounding said ceramic tube, a sheath of ceramic material occupying the space between said tube and said casing, coil means cast in place within said ceramic material comprising a first coil supported on the surface of said tube for producing an electrical signal in response to a change in magnetic flux linking said coil and a second coil spaced from the surface of said tube for generating a magnetic field within the interior of said tube, said ceramic material maintaining said first and second coils in fixed position in relation to said tube, and magnetizing means for establishing a steady, unidirectional magnetic field within said tube at a location spaced upstream from said coils, and a ferromagnetic member encircling said tube interposed between said magnetizing means and said coils.

7. In a nuclear magnetic resonance flowmeter, the combination comprising an elongate central ceramic tube, a metallic casing surrounding said ceramic tube, a sheath of ceramic material occupying the space between said tube and said casing, coil means cast in place within said ceramic material comprising a first coil supported on the surface of said tube for producing an electrical signal in response to a change in magnetic flux linking said coil and a second coil spaced from the surface of said tube for generating a magnetic field within the interior of said tube, said ceramic material maintaining said first and second coils in fixed position in relation to said tube, and first and second pairs of coils cast in place and spaced from the surface of said tube, said first and second pairs of coils producing perpendicular magnetic fields, the ends of said second pair of coils overlying the ends of said first pair of coils and said second pair of coils being longer in a direction parallel to the axis of the tube than said first pair of coils.

References Cited
UNITED STATES PATENTS

| 1,947,085 | 2/1934 | Hill | 336—96 |
| 3,080,520 | 3/1963 | O'Reilly | 324—0.5 |
| 3,419,795 | 12/1968 | Vander Heyden et al. | 324—0.5 |

MICHAEL J. LYNCH, Primary Examiner

U.S. Cl. X.R.

73—194

UNITED STATES PATENT OFFICE
CERTIFICATE OF CORRECTION

Patent No. 3,564,400          Dated February 16, 1971

Inventor(s) R. L. Pike, William H. Vander Heyden & John F. Tos

It is certified that error appears in the above-identified patent and that said Letters Patent are hereby corrected as shown below:

Column 2, line 33, delete "jacket" after "casing"

Column 3, line 51, "surrounding" should be -- surrounds --

Column 6, line 2, "metal" should be -- material --

Column 6, line 28, "The" (first occurrence) should be -- then --

Column 6, line 52, (claim 1) "and" should be -- end --

Column 7, line 31, (claim 4) insert -- being -- before "disposed"

Signed and sealed this 22nd day of June 1971.

(SEAL)
Attest:

EDWARD M. FLETCHER, JR.
Attesting Officer

WILLIAM E. SCHUYLER, JR.
Commissioner of Patents